(12) United States Patent
Ochovo

(10) Patent No.: US 7,066,036 B2
(45) Date of Patent: Jun. 27, 2006

(54) INSTRUMENT FOR MEASURING SUSPENDED MASSES FOR MACHINES THAT OPERATE WITH TRACTION CABLES

(75) Inventor: Javier Muñoz Ochovo, Madrid (ES)

(73) Assignee: Micelect, S.L., Madrid (ES)

( * ) Notice: Subject to any disclaimer, the term of this patent is extended or adjusted under 35 U.S.C. 154(b) by 16 days.

(21) Appl. No.: 10/501,969

(22) PCT Filed: Apr. 11, 2002

(86) PCT No.: PCT/ES02/00177

§ 371 (c)(1),
(2), (4) Date: Jul. 19, 2004

(87) PCT Pub. No.: WO03/062762

PCT Pub. Date: Jul. 31, 2003

(65) Prior Publication Data

US 2005/0028612 A1    Feb. 10, 2005

(30) Foreign Application Priority Data

Jan. 23, 2002  (ES)  ............................. 200200136

(51) Int. Cl.
*G01L 1/04* (2006.01)

(52) U.S. Cl. .................................................. 73/862.472
(58) Field of Classification Search ........... 73/862.472, 73/862.392
See application file for complete search history.

(56) References Cited

U.S. PATENT DOCUMENTS

| 2,362,626 A | 11/1944 | Giffen |
| 5,728,953 A * | 3/1998 | Beus et al. ............ 73/862.472 |
| 2003/0097885 A1* | 5/2003 | Kell ........................... 73/862 |

FOREIGN PATENT DOCUMENTS

ES    2 150 364    11/2000

* cited by examiner

*Primary Examiner*—Max Noori
(74) *Attorney, Agent, or Firm*—Lucas & Mercanti, LLP

(57) ABSTRACT

Measuring instrument for hanging masses for machines which operate with traction cables, including a body (1) in which some extreme stops (2) are incorporated to support the cables (9) of application, having in the central area a cable (9) pressure element (6), made up of a cylinder which is held on a support (4) with inclusion of some cylindrical washers (8) that can be substituted, by means of which a selective separation of the cylinder (6) is established respect to the body (1) for the passage of the cables (9) of application.

3 Claims, 4 Drawing Sheets

INSTRUMENT FOR MEASURING SUSPENDED MASSES FOR MACHINES THAT OPERATE WITH TRACTION CABLES

The present invention refers to a measuring instrument with hanging masses for machines which work with traction cables, bringing about some improvements which affect the structure of the instrument, with repercussion on its functional behaviour.

The instrument to which the invention refers is for application with general character in the hoisting area for any type of charge by means of the use of traction cables and in a particular way in the industry of lift installation with elevation by means of cables.

The existence of mass weighing systems which hang on cables is known in several applications, the mentioned systems are essentially made up of two independent parts, being one of them a sensing device and the other an electronic data processing centre, being it necessary to join both parts with connecting cables, which supposes an important inconvenience, as in the lift installations, the availability of space is very reduced. These systems require moreover a calibration of the installation, for which it is necessary to use reference masses hanging from the cables of application.

To the respect, U.S. Pat. No. 9,801,300 presents an instrument which is configured in a monoblock set, incorporating in the mentioned set a tension detecting transducer for the cables of application and their variations, as well as a processor to translate the tension signals of the cables into weight units.

The mentioned instrument of U.S. Pat. No. 9,801,300 is made up of a central body, on which some supporting stops of the cables of application are incorporated and centrally a pressure flange on the cables, including in the central body the electronic operation components.

The pressure flange on the cables is included in its case with a fixed position fastening respect to the central body and structured with some housing cells for the cables of application, which conditions the mentioned flange, in the application, for a certain number of cables and respect to the diameter of the same, so that it is necessary to use in each case a different flange in function of the number and of the diameter of the cables of the installation of application.

According to the present invention, a similar instrument to the one mentioned in U.S. Pat. No. 9,801,300 is proposed, but with some improvements referring to the pressure flange on the cables, in such a way that some more advantageous features are obtained, allowing the use of the same flange independent from the cables of application.

This instrument object of the invention is made up of a central body which houses the electronic operation components, with terminals to the outside for the necessary connections, having on the mentioned body some supporting stops for the cables of application and in the central area a pressure flange of the cables towards the central body, the mentioned flange is made up of a cylinder which is supported by means of fastening screws respect to a support fastened to the central body, including in the fastening tying of the mentioned cylinder some cylindrical washers which act as separating devices between the mentioned cylinder and the fastening support.

This way an instrument is obtained which can be applied for any number of cables, as the cylinder which makes up the pressure flange on the cables shows a continuous front which can lean on the cables of application without defined points respect to the same, so that the support is susceptible without any condition respect to the number of cables, whenever the set of these remains within the longitudinal measure of the mentioned pressure cylinder.

The separating washers between the cylinder and the fastening support, determine the separation of the cylinder respect to the central body, so that the cables of application can enter between both, so that by substituting the mentioned washers the separating space between the cylinder and the central body can be modified in function of the diameter of the cables of application, being the instrument usable with the same pressure cylinder for cables of any diameter.

This way an instrument is obtained with some really advantageous features for the measuring of the hanging masses in function of the tension of the supporting cable, acquiring the mentioned instrument own life and preferable character respect to the previously known instruments with the same function.

Figure 1:
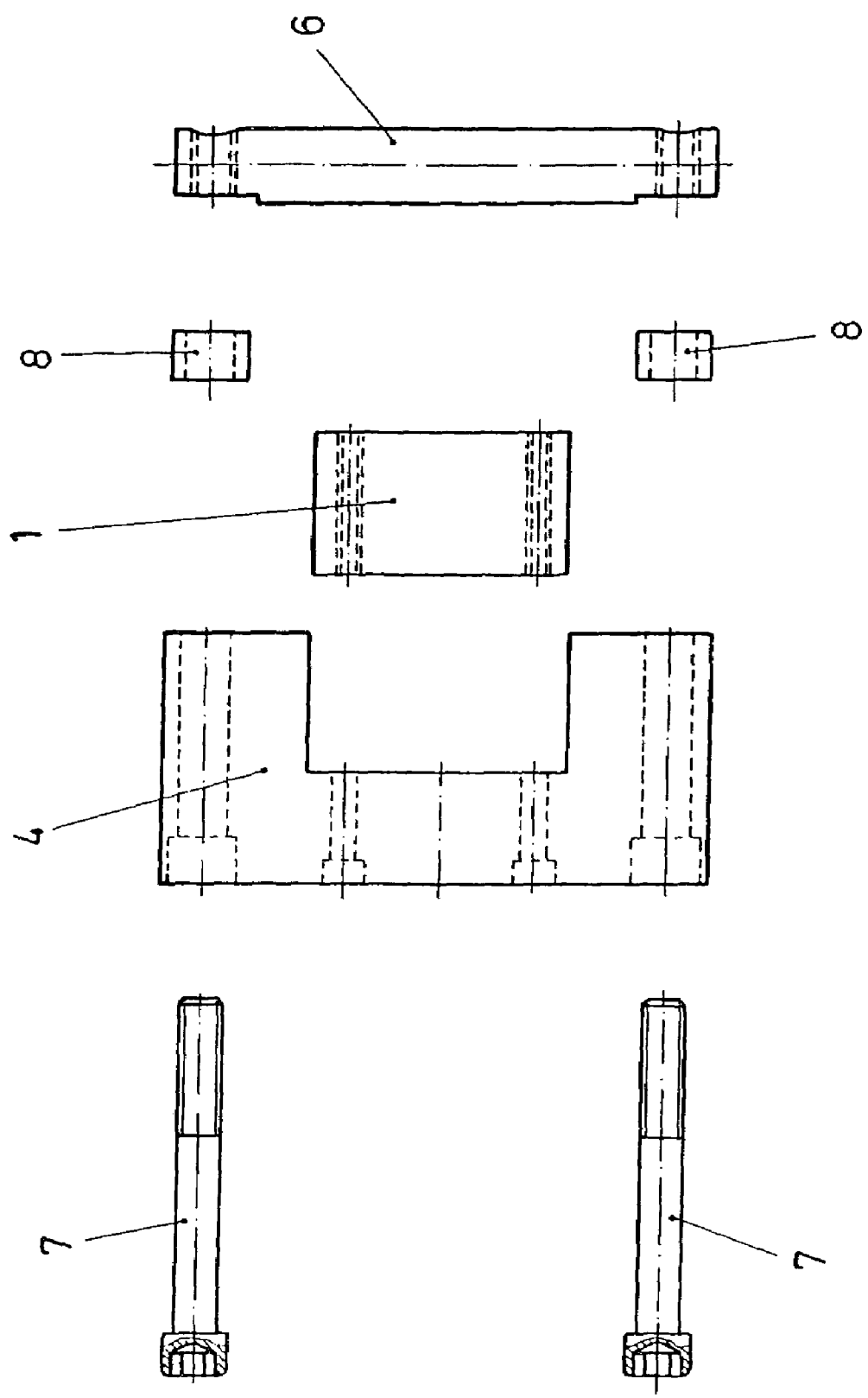
FIG. 1 shows an exploded upper view of the instrument object of the invention, without the supporting stops for the cables of application on the central body.
Figure 2:
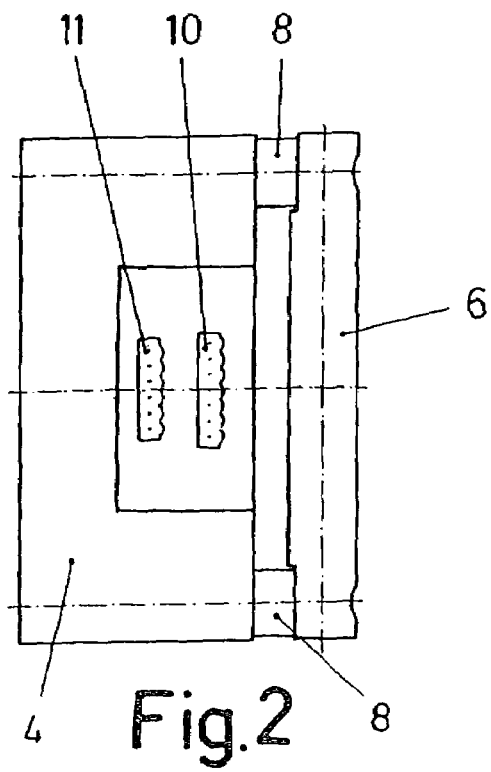
FIG. 2 is an upper view of the connected previous set.
Figure 3:
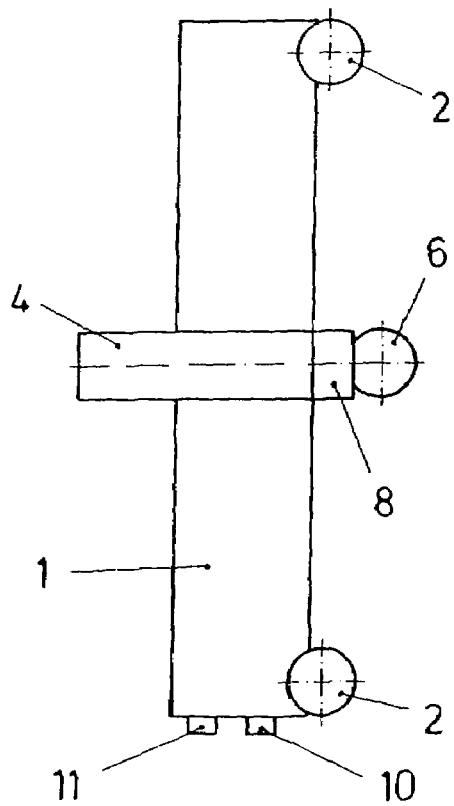
FIG. 3 is a side view of the complete set of the preconized instrument.
Figure 4:
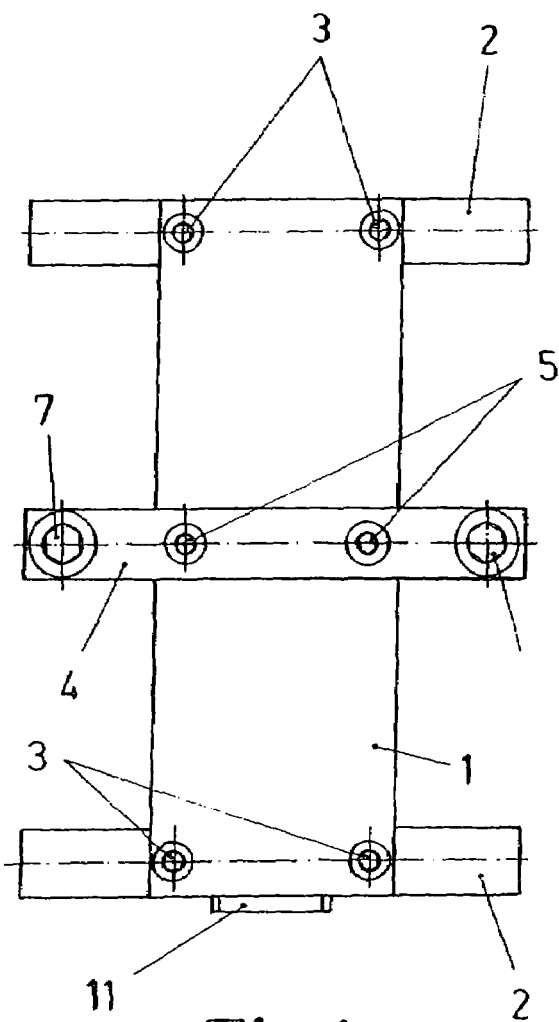
FIG. 4 is a corresponding front rear view of the instrument.

The measuring instrument of the hanging masses, object of the invention is made up of a central body (1) structured according to an enlarged prismatic shape, in hard material of some adequate elastic constants.

Referring to the extreme areas of one of the front faces, some transverse stops (2) are situated on the mentioned body (1), made up of cylinders which remain leaned on the body (1) being supported by means of fastening screws (3).

In the central area of the body (1) moreover a support (4) is incorporated in the shape of a "U" which surrounds the mentioned body (1) at the rear part, being fixed by means of some respective fastening screws (5), while at the front part transversely a cylinder (6) is situated which is held fixed on the support (4) by means of fixing screws (7).

Between the cylinder (6) and the support (4) some cylindrical washers (8) are included in the fastening supports. The cylindrical washers establish a separation of the mentioned cylinder (6) to the outside, determining a separation space between the mentioned cylinder (6) and the body (1), which is a function of the longitudinal dimension of the washers (8).

Figure 5:
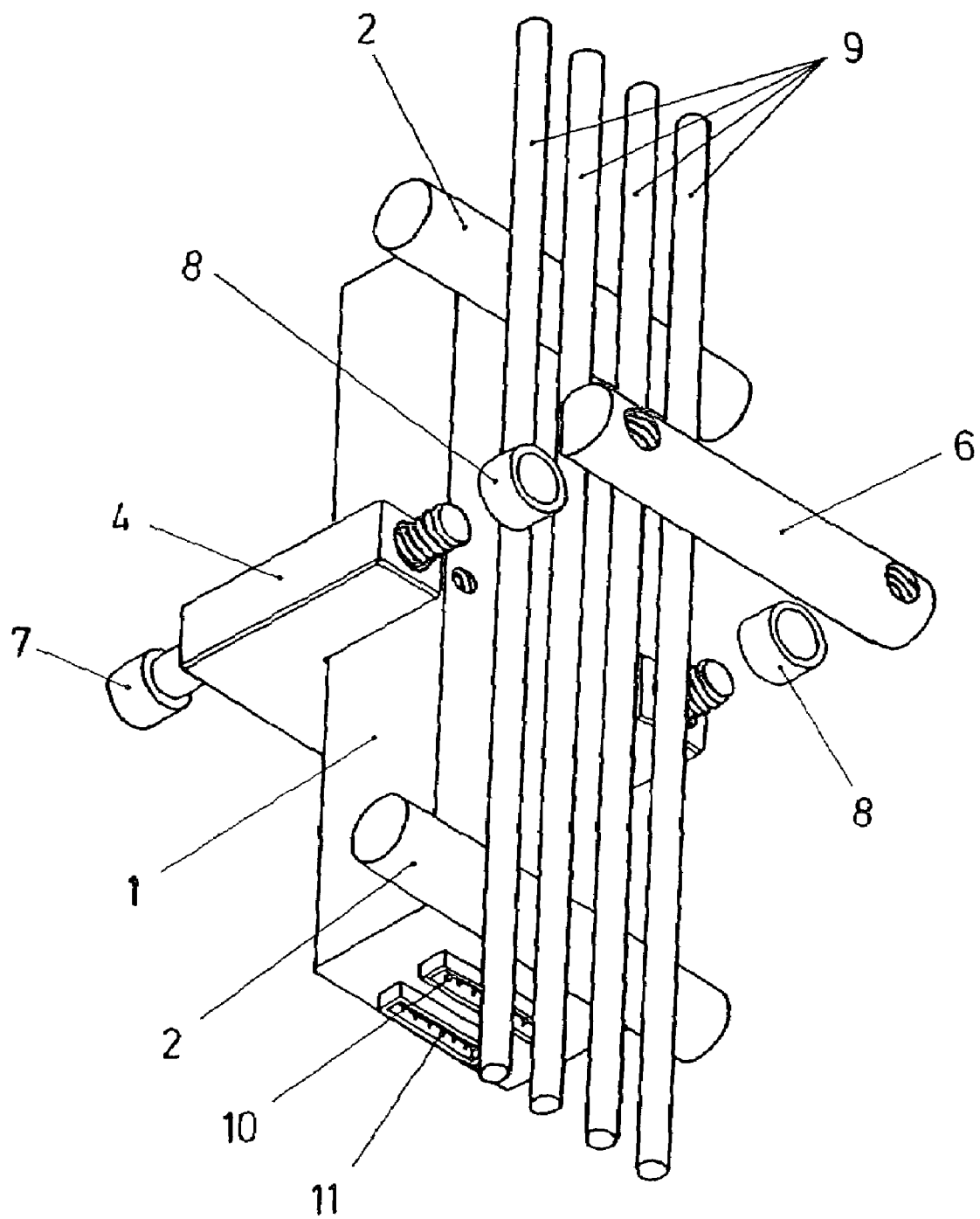
FIG. 5 is a perspective of the instrument in assembly phase respect to some cables of application.
Figure 6:
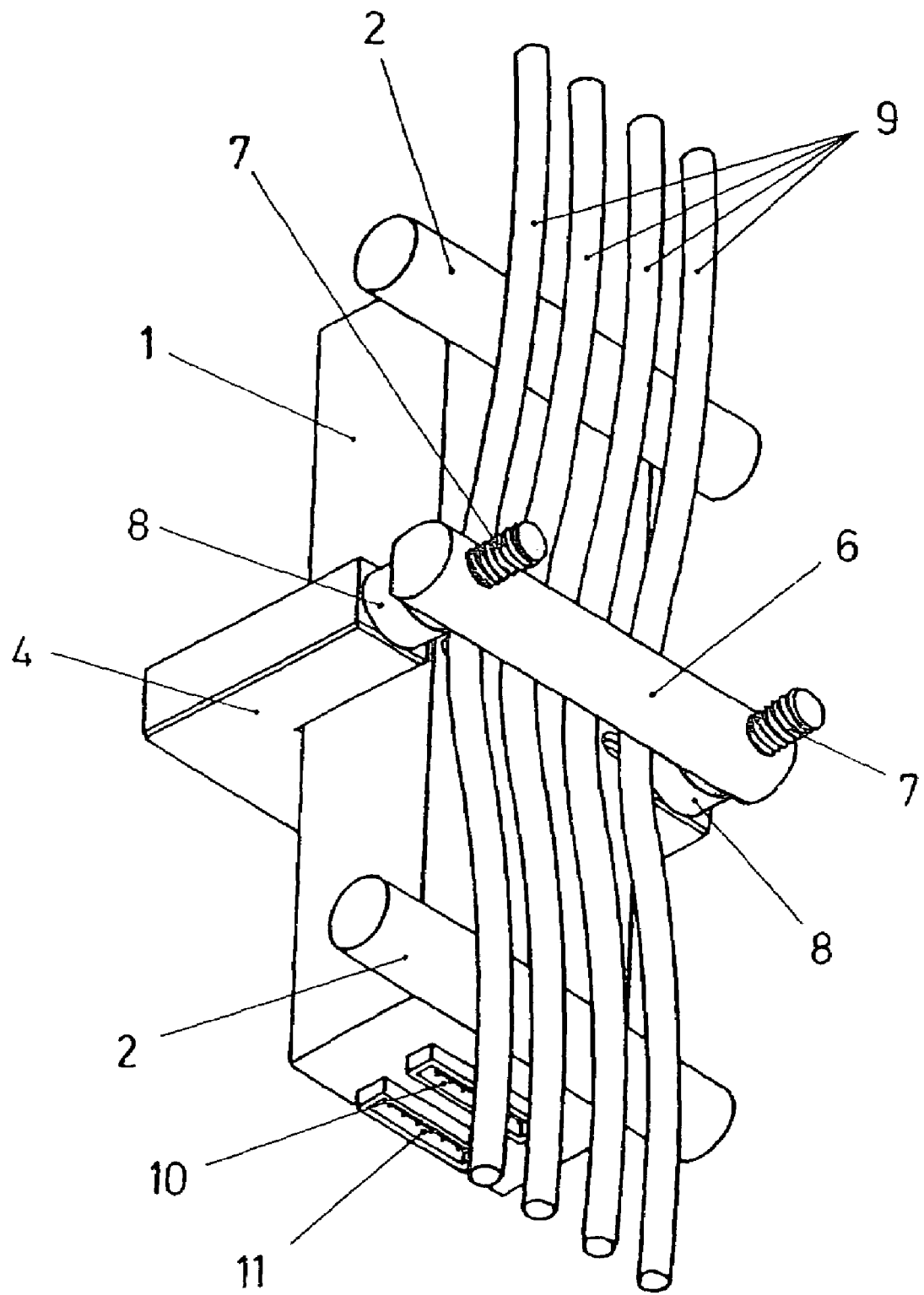
FIG. 6 is a perspective of the instrument in practical disposition on the cables of application.

With it this way, the instrument can be applied in its practical disposition with respect to the supporting cables (9) of the hanging masses of application, in the way shown on FIGS. 5 and 6, i.e. situating the body (1) with the stops (2) leaned on the cables (9), incorporating afterwards at the other side of the cables (9) the cylinder (6) with the washers (8) intercalated in the fastening with respect to the support (4), so that when the screws (7) are fastened, the cylinder (6) remains tight against the washers (8) and these against the support (4), a bending of the cables (9) is established, as indicated on FIG. 6.

This way a disposition results in which the tension of the cables (9) exerts an opposed reaction on the supports on the stops (2) and on the cylinder (6), which allows to detect, by means of the corresponding sensing devices, the variations of tension the cables suffer (9), when the suspended charge is increased or reduced, to translate the mentioned variations into weight units, being it possible to make the mentioned variations of the cable (9) tensions rebound, in any system, such as for example the security control of elevation devices, such as lifts, cranes, etc.

In the body (1) the necessary electronic components are included to show the variations of the cable (9) tensions of application and to process the corresponding data so as to translate the mentioned variations of the cable tension (9) into weight units, for example to reflect it on a visualization screen, as well as to generate the administration signals for any type of control.

In this sense, in the central body (1) a transducer is included and a microprocessor circuit, with terminals (1) and (11) to the outside to establish the necessary connections.

According to a realization shape, the microprocessor circuit is foreseen, for example, with an intercommunicated regulating device with some piezoresistive sensing devices placed on the central body (1), which are connected with a conditioning amplifying device, whereafter an analog/digital converter is connected to a controller foreseen of a visualization display and with programming keys.

According to its supporting function for the cables (9) of application, the stops (2) and the cylinder (6) are made up of a resistant material to the effect, as well as a smooth exterior surface so that the cable (9) friction is minimum.

The stops (2) and the cylinder (6) allow the support of any number of cables which remain as a whole inside the longitudinal measure of the cylinder (6) between its fastening fixing, so that the instrument can be used with the same elements for applications with different amounts of cables (9).

On the other hand, the cylindrical washers (8) determine the separation space between the cylinder (6) and the central body (1) for the passage of the cables (9) of application, so that for applications respect to cables (9) with different diameter, it is only necessary to substitute the washers (8) so that the space between the cylinder (6) and the central body (1) is in each case the adequate for the diameter of the corresponding cables (9) of application.

The invention claimed is:

1. An instrument to measure hanging masses for machines which operate with traction cables comprising:
   a central body having electronic components to show tension variations of the cables and translate the tension variations into weight units;
   two stops affixed at each end of the central body to support and space the cables away from the central body;
   a pressure element centrally positioned between the two stops and suspended from the central body by screws and a support, the pressure element being a cylinder made of resistant material having a smooth surface, the cables passing between the pressure element and the central body;
   the screws releasable attached to the support and the pressure element such that tightening of the screws cause the cables to bend against the central body at the pressure element and to bend away from the central body at each of the stops;
   replaceable cylindrical washers on the screws which separate the pressure element from the support providing a separating distance for passage of the cable between the pressure element and the central body.

2. The instrument of claim 1 wherein the cylindrical washers are replaceable with others cylindrical washers having different lengths, to establish the separation between the pressure element and the central body according to the diameter of the cables.

3. The instrument of claim 1 wherein the electronic components housed in the central body have terminals for external connections.

* * * * *